United States Patent
Berry et al.

(10) Patent No.: US 6,289,503 B1
(45) Date of Patent: Sep. 11, 2001

(54) SYSTEM AND METHOD FOR TRACE VERIFICATION

(75) Inventors: Robert Francis Berry; Riaz Y. Hussain, both of Austin; Chester Charles John, Jr., Round Rock; Frank Eliot Levine, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/159,963

(22) Filed: Sep. 24, 1998

(51) Int. Cl.[7] ...................................................... G06F 9/45
(52) U.S. Cl. .................................................. 717/4; 717/1
(58) Field of Search ...................... 717/4; 707/1; 710/15; 712/226; 714/38

(56) References Cited

U.S. PATENT DOCUMENTS

| | | | |
|---|---|---|---|
| 4,425,618 | * | 1/1984 | Bishop et al. ........................... 712/26 |
| 4,558,413 | | 12/1985 | Schmidt et al. ...................... 707/203 |
| 4,930,073 | | 5/1990 | Cina, Jr. .............................. 710/200 |
| 5,423,039 | * | 6/1995 | Matteson ............................. 709/107 |
| 5,450,586 | * | 9/1995 | Kuzara et al. ........................... 717/1 |
| 5,564,038 | * | 10/1996 | Grantz et al. ......................... 711/164 |
| 5,574,898 | * | 11/1996 | Leblang et al. .......................... 707/1 |
| 5,581,696 | * | 12/1996 | Kolawa et al. .......................... 714/38 |
| 5,649,200 | | 7/1997 | Leblang et al. ........................... 717/3 |
| 5,729,744 | | 3/1998 | Gerken et al. ........................ 707/203 |
| 5,748,878 | * | 5/1998 | Rees et al. ............................. 714/38 |
| 5,867,643 | * | 2/1999 | Sutton ................................... 710/15 |

OTHER PUBLICATIONS

JavaOS(tm): A Standalone Java(tm) Environment, available via the Internet at http://www.java.sun.com/products/javaos/javaos.white.html, copy printed Aug. 11, 1998, pp. 1–14.

JavaOS(tm): The Standalone Java–Application Platform, available via the Internet at http://www.java.sun.com/products/javaos/index.html, copy printed Aug. 11, 1998, pp. 1–4.

Madany, JavaOS™: A Standalone Java™ Environment, java.sun.com, Aug. 1998.*

* cited by examiner

*Primary Examiner*—Mark R. Powell
*Assistant Examiner*—Hoang-Vu Antony Nguyen-ba
(74) *Attorney, Agent, or Firm*—Kelly K. Kordzik; Winstead Sechrest & Minick P.C.; Jeffrey S. LaBaw

(57) ABSTRACT

When building an image for a JavaOS client, a date/time stamp is inserted into the symbolic image produced. When a trace program is initiated against this image, the same Build Identifier is inserted into the produced trace data. A comparison is made between the Build Identifiers to ensure that the trace file is analyzed using the correct symbolic image.

22 Claims, 2 Drawing Sheets

SYSTEM AND METHOD FOR TRACE VERIFICATION

TECHNICAL FIELD

The present invention relates in general to data processing systems, and in particular, to programming for data processing systems.

BACKGROUND INFORMATION

Today's real-world computing environments consist of many different and often incompatible hardware systems, operating systems and product versions running on client/server networks. As a result, Management Information Systems (MIS) professionals face daunting obstacles in deploying, updating and maintaining applications on all the clients and servers across their enterprises. JavaOS has been designed to help overcome these obstacles.

JavaOS is a software platform that enables Java applications to run directly on hardware without requiring a host operating system. JavaOS includes the Java Virtual Machine, the standard packages of classes, and enough operating system ("OS") code to support them. The OS code includes low-level code written in C or assembly language, plus device driver, networking, windowing, and graphics-rendering code mostly written in the Java programming language.

One application for JavaOS is to run Java programs on a variety of computing and consumer platforms. JavaOS is an operating system programmed as an object. JavaOS has been designed specifically to support Java and Java applets without having to provide backward compatibility with other legacy applications. This approach improves performance by eliminating needless layers of software and enabling the operating system to run in minimal memory configurations.

Despite all the advantages of JavaOS, there still is a need to analyze or debug programs generated in JavaOS. As with other program execution environments, one of the most common methods for debugging a program is to implement a trace program. Trace files generated from a JavaOS client are often analyzed using information that is available from the build image containing symbolic data regarding the C and the similar functions in the Java classes and their methods. The symbolic image is stripped in order to have the client load a small image. The problem is that there is an exposure for the end-user to use the wrong symbolic image with the generated trace file and thereby receive incorrect results. A variation of this problem occurs when a trace file is available and a user is not confident against which image the trace was generated.

SUMMARY OF THE INVENTION

The present invention addresses the foregoing need by ensuring that the trace file is analyzed using the correct symbolic image. This is implemented by generating a date/time stamp as part of the build process to be used to validate that the trace file and the symbolic image correspond to each other.

In one embodiment of the present invention, a build identifier is updated with an updated date/time stamp and version number. The process then builds the program to be traced and the build identifier is placed into the symbol file. The object code of the program is then installed into a designated machine. A trace is initiated against this program collecting data regarding specified events occurring within the program. The build identifier is captured and placed into the raw file produced by the trace program. A comparison is then made between the build identifier in the raw file and the build identifier within the symbol file. If there is a match, post-processing of the trace data is continued.

The foregoing has outlined rather broadly the features and technical advantages of the present invention in order that the detailed description of the invention that follows may be better understood. Additional features and advantages of the invention will be described hereinafter which form the subject of the claims of the invention.

The present invention is applicable to any situation where data collected from an executing system (or object) image needs to be compared to a static copy of that same image.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
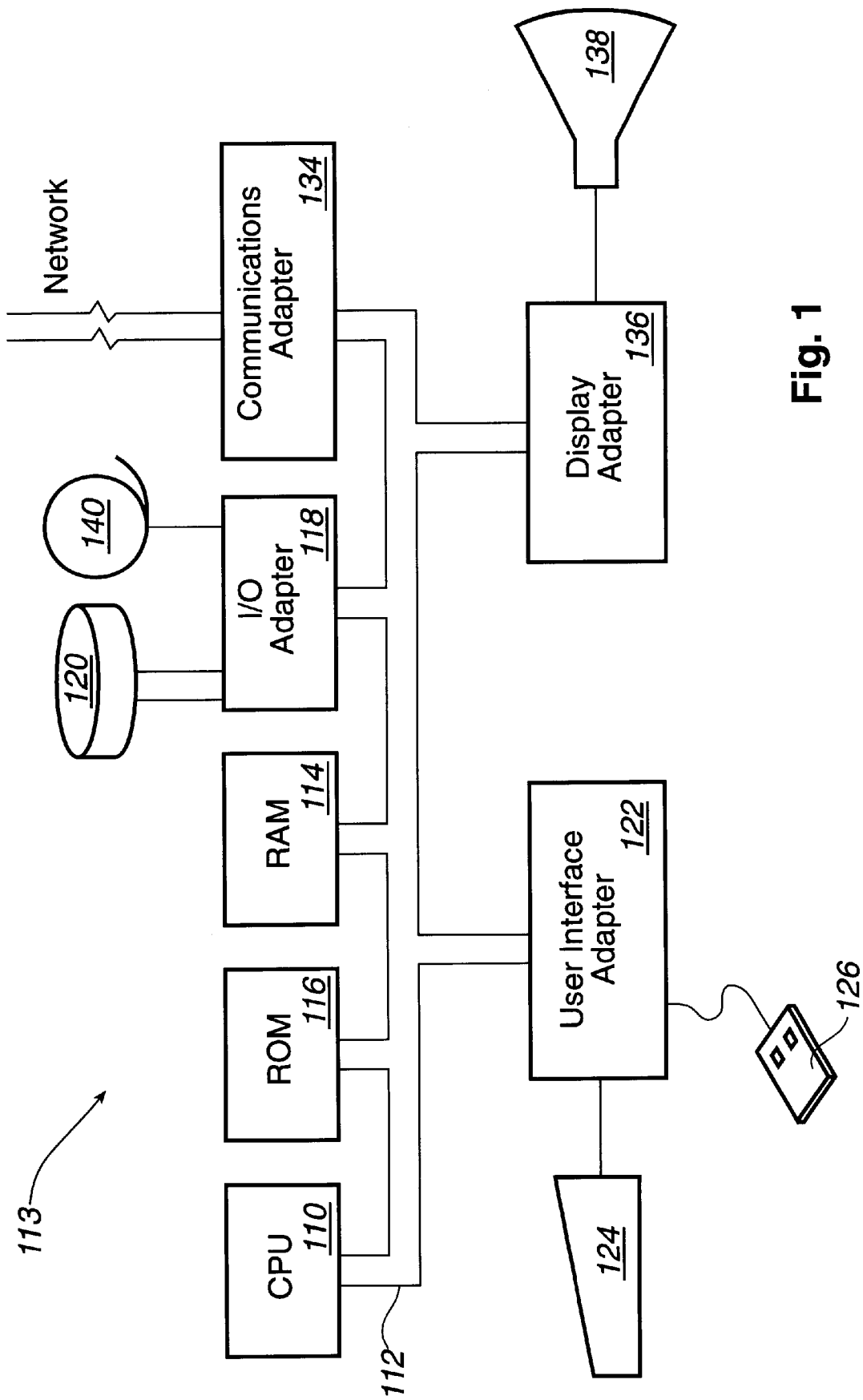
FIG. 1 illustrates a data processing system configured in accordance with the present invention.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring first to FIG. 1, an example is shown of a data processing system 100 which may be used for running the method of the invention. The system 100 has a central processing unit (CPU) 110 coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communication with other such systems. For example, various components, or steps, of the present invention may be run on separate machines coupled together in a network.

Input/Output devices are also connected to system bus 112 via user interface adapter 122 and display adapter 136. Keyboard 124 and mouse 126 are interconnected to bus 112 via user interface adapter 122. Display monitor 138 is connected to system bus 112 by display adapter 136. In this manner, a user is capable of inputting to the system throughout the keyboard 124 or mouse 126 and receiving output from the system via display 138.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory, for example, in disk drive 120 (which may include a removable memory such as an optical disk or floppy disk for eventual use in the disk drive 120). Further, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

When a trace program is applied to the operation of an object, the trace program is searching for the occurrences of certain events. Upon the occurrence of these events, data is output, which may include a state of the program at the occurrence of each such event, and the address of the instruction at the time of the occurrence of the event. This trace data is then outputted as raw data into a trace file (also referred to herein as a "raw file"). Post-processing of the raw file is then performed in a manner specified by the programmer of the trace program.

However, the present invention is not dependent upon a trace being performed, but is also applicable to any situation where data is collected from an executing object or image, and then possibly later manipulated.

In JavaOS, during the build process after the program is compiled, the modules within the program are linked. Furthermore, a map, or symbol file (also referred to herein as a "symbolic file" or "symbolic image"), is produced that indicates where functions are located by their addresses (memory locations) and, optionally, the length they occupy within memory. The symbols essentially are the file names of the functions within the program. This build process creates an image of the entire JavaOS image (program), which can be downloaded and run on the appropriate computer hardware. Other programs can be built in a similar manner. The resolution of linkages between subroutines may be done at build time or at load time, that is, when the application is being run.

Note, the present invention is not limited to a symbolic image, but is applicable to any static copy of the image.

It is often desired to analyze the trace file (collected data) with the symbolic image (static image). The trace file contains addresses of modules and program counters used to identify a position within a module. The symbolic information is used by the trace analyzer program to convert the physical addresses to symbolic names, which are understandable by humans. However, as briefly noted above, there is a risk that the wrong symbolic image will be used to analyze the trace file. The present invention ensures that the symbolic file corresponds to the trace file. This is performed by including a date/time stamp within both the symbolic file and the trace file.

Figure 2:
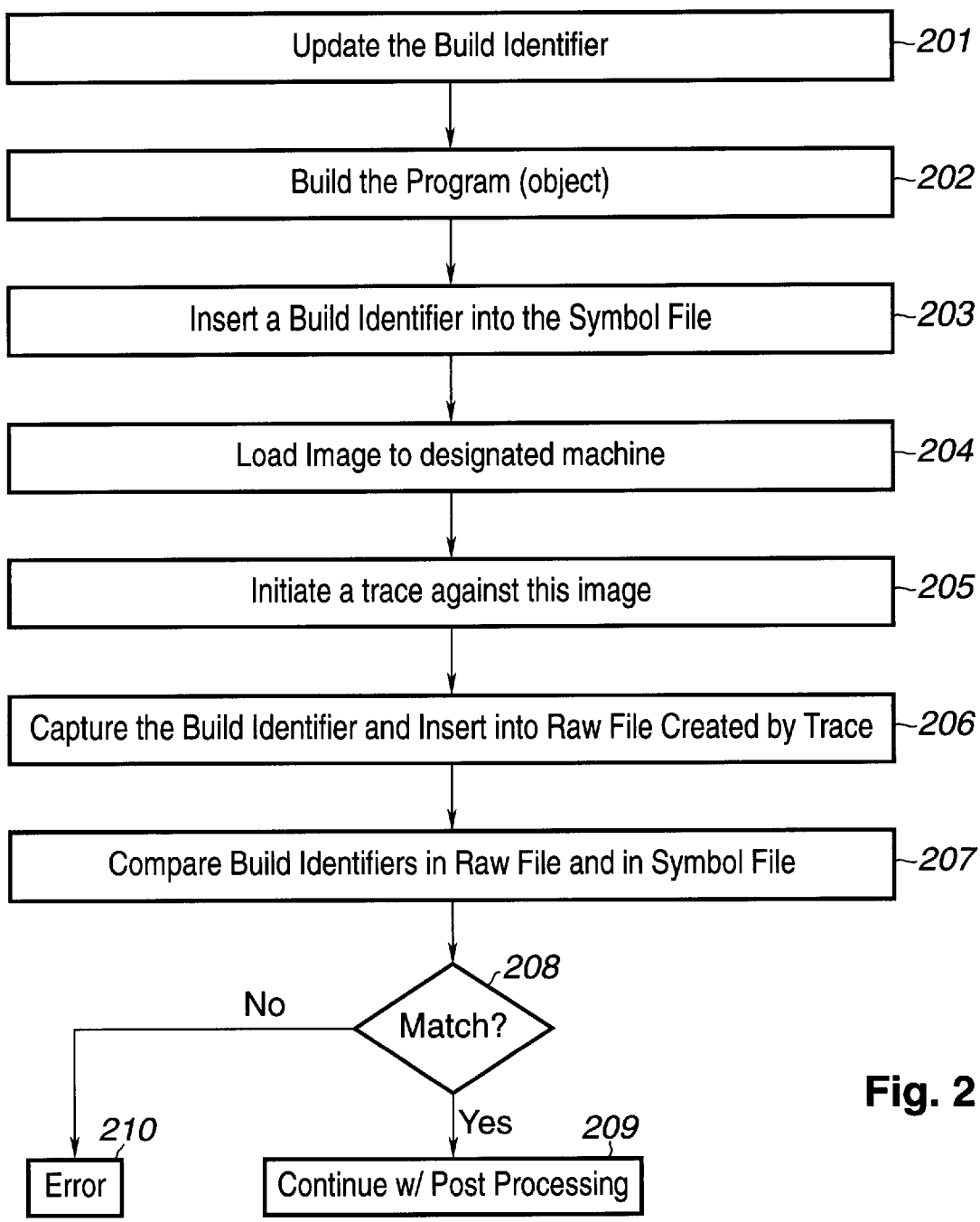
FIG. 2 illustrates a flow diagram configured in accordance with the present invention and operable for running on the data processing system illustrated in FIG. 1.

Referring to FIG. 2, during the build process, the Build Identifier will be updated with a date/time stamp and a version number, which is incremented each time a new build is produced, resulting in a unique Build Identifier. In step 202, the program (object) is built. In step 203, the Build Identifier is inserted into the produced symbol file. In step 204, the object code pertaining to the program is installed into a designated machine (server), which is also referred to as the loading or copying of the image (object) to the designated machine. In step 205, the desired trace program is initiated against this image (object). The trace is a programmable operation collecting data regarding events occurring in the program. In step 206, the previously updated Build Identifier is captured and inserted into the trace file produced by step 205. The trace data may be collected into a buffer or raw file. A separate BIF (Build Identifier File) may be used to contain the build identifier. This file is read into RAM, the version number is incremented, and the current time is captured. The file is written back to disk with the new information. The data from this file is copied to the symbol file in a designated position, preferably the front of the file. A copy to the beginning may be performed by writing a temporary file with the build information, followed by the symbolic map information and then copied over the file with just the map information. Also, during the build process, the string data representing the build identifier is linked into the build image.

Thereafter, in step 207, a post-processor program is initiated whereby the Build Identifiers within the raw file and the symbol file are compared. The raw file's header is updated with the build identifier by involving a subroutine during trace initiation that returns the build identifier string. In step 208, if the Build Identifiers match, then the process proceeds to step 209 to continue with post-processing of the trace file. However, if the Build Identifiers do not match, then another step may be performed, such as step 210 where an error message is returned to the user.

The present invention has been described above with respect to JavaOS, which is a single object. However, the present invention is also applicable to other systems having many objects, whereby the principles of the present invention are applied to a multiple of sub-systems.

The present invention has been described above with specific reference to trace. Trace is typically implemented as a time serial recording of events, subsequently post-processed by a trace analyzer. However, the present invention is also applicable to any situation involving the manipulation of data collected from an executing system (or object) image whose analysis has dependencies on additional data which is to be obtained from a static copy of that same image.

Although the present invention and its advantages have been described in detail, it should be understood that various changes, substitutions and alterations can be made herein without departing from the spirit and scope of the invention as defined by the appended claims.

What is claimed is:

1. A method comprising the steps of:

building a software program;

inserting a build identifier into a static image of the software program;

collecting data from an execution of the software program to produce a data file;

inserting the build identifier into the data file; and comparing the build identifier of the data file to the build identifier of the static image.

2. The method as recited in claim 1, further comprising the step of:

post processing of the data file when the build identifiers are identical.

3. The method as recited in claim 1, further comprising the step of:

discontinuing post processing of the data file when the build identifiers are not identical.

4. The method as recited in claim 1, wherein the static image is a symbol file, corresponding to the software program, produced as a result of the building step, and wherein the collection of data is produced by running a trace program against the software program to produce a trace file.

5. The method as recited in claim 4, wherein the software program is created in JavaOS.

6. The method as recited in claim 5, wherein the software program is an object.

7. The method as recited in claim 1, wherein the build identifier is a date/time stamp.

8. The method as recited in claim 7, wherein the date/time stamp includes a version number unique to the building step performed.

9. The method as recited in claim 4, wherein the symbol file includes a mapping of functions in the software program to their addresses.

10. The method as recited in claim 4, wherein the trace file includes data pertaining to events traced during operation of the software program.

11. A data processing system comprising one or more processors coupled to a memory device, an input device, and an output device by a bus system, wherein the one or more processors further comprise:

circuitry for building a software program;

circuitry for inserting a build identifier into a symbol file, corresponding to the software program, produced as a result of the building step;

circuitry for running a trace program against the software program to produce a trace file;

circuitry for inserting the build identifier into the trace file;

circuitry for comparing the build identifier of the trace file to the build identifier of the symbol file;

circuitry for post processing of the trace file when the build identifiers are identical; and circuitry for discontinuing post processing of the trace file when the build identifiers are not identical.

12. The system as recited in claim 11, wherein the software program is created in JavaOS.

13. The system as recited in claim 11, wherein the build identifier is a date/time stamp with a version number unique to the building step performed, wherein the symbol file includes a mapping of functions in the software program to their addresses, wherein the trace file includes data pertaining to events traced during operation of the software program.

14. A computer program product adaptable for storage on a computer readable medium comprising program elements operable for:

building a software program;

inserting a build identifier into a symbol file, corresponding to the software program, produced as a result of the building element;

running a trace program against the software program to produce a trace file;

inserting the build identifier into the trace file; and comparing the build identifier of the trace file to the build identifier of the symbol file.

15. The computer program product as recited in claim 14, further comprising the program element operable for:

post processing of the trace file when the build identifiers are identical.

16. The computer program product as recited in claim 15, further comprising the program element operable for:

discontinuing post processing of the trace file when the build identifiers are not identical.

17. The computer program product as recited in claim 15, wherein the software program is created using an object-oriented programming language.

18. The computer program product as recited in claim 17, wherein the software program is created in JavaOS.

19. The computer program product as recited in claim 14, wherein the build identifier is a date/time stamp that includes a version number unique to the building element performed.

20. The computer program product as recited in claim 19, wherein the symbol file includes a mapping of functions in the software program to their addresses.

21. The computer program product as recited in claim 20, wherein the trace file includes data pertaining to events traced during operation of the software program.

22. A JavaOS program adaptable for storage on a computer readable medium comprising program elements operable for:

building a software program;

inserting a build identifier into a symbol file, corresponding to the software program, produced as a result of the building element, wherein the build identifier is a date/time stamp that includes a version number unique to the building element performed, wherein the symbol file includes a mapping of functions in the software program to their addresses;

running a trace program against the software program to produce a trace file, wherein the trace file includes data pertaining to events traced during operation of the software program;

inserting the build identifier into the trace file;

comparing the build identifier of the trace file to the build identifier of the symbol file;

post processing of the trace file when the build identifiers are identical; and discontinuing post processing of the trace file when the build identifiers are not identical.

* * * * *